United States Patent

[11] 3,565,181

[72] Inventors Ernest E. Bahm;
Robert H. Kucera, Rte. 2, Ashland, Nebr. 68002
[21] Appl. No. 725,806
[22] Filed May 1, 1968
[45] Patented Feb. 23, 1971

[54] BLADE ATTACHMENT APPARATUS
6 Claims, 4 Drawing Figs.
[52] U.S. Cl. .................................................... 172/491,
172/776, 172/801
[51] Int. Cl. .................................................... A01b 63/108,
E02f 3/76
[50] Field of Search ......................................... 172/801-
—807, 809, 413, 417, 484, 491, 273, 277;
280/402, 481, 150 (F), 456, 503; 293/50 (P), 73

[56] References Cited
UNITED STATES PATENTS

| | | | |
|---|---|---|---|
| 1,788,698 | 1/1931 | Wooldridge | 172/806X |
| 2,449,315 | 9/1948 | Partin | 280/503X |
| 2,624,132 | 1/1953 | Henry | 172/277X |
| 2,645,866 | 7/1953 | McGee | 172/806X |
| 2,678,508 | 5/1954 | Reuter et al. | 172/807 |
| 2,743,118 | 4/1956 | Dotson | 280/503X |
| 3,006,090 | 10/1961 | Gwinn | 172/808X |
| 3,065,803 | 11/1962 | Pierson | 172/491X |
| 3,111,174 | 11/1963 | Fry et al. | 172/484X |
| 3,246,406 | 4/1966 | Ray | 172/804 |

Primary Examiner—Robert E. Bagwill
Assistant Examiner—Alan E. Kopecki
Attorney—Henderson & Strom ABSTRACT: This invention pertains to a tractor blade attachment apparatus comprising a frame pivotally secured on one end to the pivot holes of the conventional hitch assembly disposed on the rear of the frame of a tractor and with the front end of the frame disposed in front of the forward end of the tractor, wherein the front end of the frame is adapted to hold a blade or the like. Pivotally secured between the front end of the frame and the front end of the tractor is a hydraulic mechanism for only raising and lowering the blade. The frame includes a V-shaped element, which in conjunction with the longitudinal members of the frame transfers the stresses, caused during the operation of the blade, to the hitch assembly of the tractor. The frame of hollow beam construction contains the hydraulic lines which are fluidly interconnected between the tractor hydraulic control system and the hydraulic mechanism. Skid members are adjustably mounted on the frame members for positioning the blade relative to the ground and adjustable members are interconnected between the blade and frame for varying the pitch of the blade.

FIG. 2

PATENTED FEB 23 1971　　　　　　　　　　　　　　3,565,181
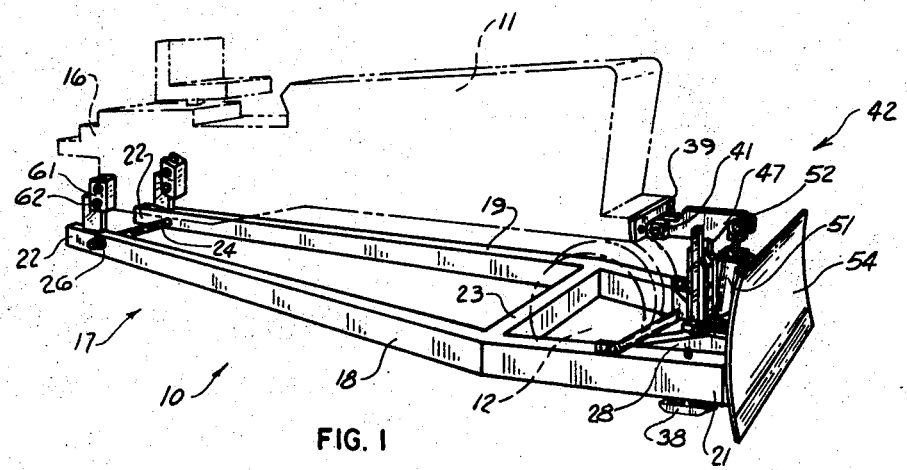
FIG. 1
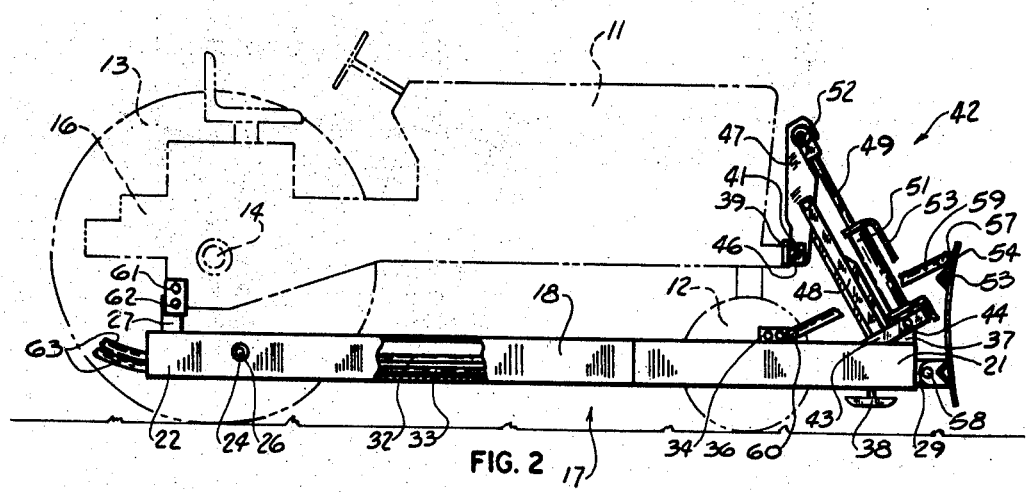
FIG. 2
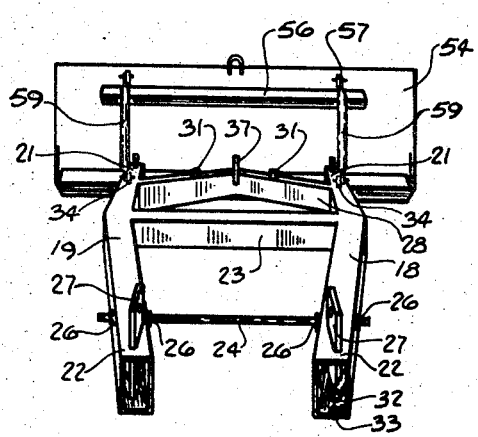
FIG. 3
FIG. 4
INVENTORS
ERNEST E. BAHM
ROBERT H. KUCERA
BY
*Henderson & Strom*
ATTORNEYS

BLADE ATTACHMENT APPARATUS

This invention relates generally to tractor attachments and more particularly to a tractor mounted blade attachment wherein the frame of the attachment is pivotally secured to the hitch assembly of the tractor, the frame is interconnected to the front end of the tractor through a hydraulic mechanism which is operable to raise and lower the blade, the frame carries the hydraulic lines to the hydraulic mechanism therein, and skids are adjustably mounted on the frame to position the blade under operating conditions at any level relative to the ground, thus relieving the load from the front wheels of the tractor and from the hydraulic mechanism.

Tractor mounted blade attachments have been developed which are mounted on the hitch assembly of a conventional tractor, have a blade which extends forwardly of the front wheels of the tractor and utilize a hydraulic mechanism to raise and lower the blade. However, it will be found that the hydraulic mechanism, if connected at the front end of the frame, employs an extremely complex linkage disposed along the sides of the tractor which is operably connected to the conventional three point hitch assembly of the tractor. This linkage is highly vulnerable to damage because of its exposed placement. Furthermore, considerable effort and time are required to mount and dismount the attachment from a conventional tractor.

Generally the attachments are also rigidly connected to the forward frame of the tractor wherein, during the operation thereof, the front wheels of the tractor are loaded and the steering and the maneuverability of the tractor are impaired. Also the stresses created during the operation of the blade are transmitted to the frame at places thereon which are not designed to absorb these stresses.

An object of this invention is to provide a blade attachment apparatus for a tractor which is simple to mount and dismount therefrom.

Another object of this invention is the provision of a blade attachment apparatus for a tractor wherein the major working stresses are transmitted to the conventional hitch assembly of the tractor.

A further object of the invention is to provide a tractor blade attachment apparatus utilizing a hydraulic mechanism interconnected between the frame of the apparatus and the frame of the tractor which only raises and lowers the blade but does not transmit any of the working stresses to the tractor.

Yet another object of this invention is to provide a tractor blade attachment apparatus utilizing the hydraulic system of the tractor which does not have any exposed linkage or hoses disposed along the sides of the tractor.

A still further object of this invention is the provision of a blade attachment apparatus for a tractor which includes a pair of adjustable skids for positioning the blade at a predetermined height above the ground and which removes the weight of the apparatus from the front wheels of the tractor, thus enhancing the steering and maneuverability of the tractor.

Another object of the invention is the provision of a tractor blade attachment apparatus which is universally mountable on substantially any tractor.

A further object of this invention is to provide a tractor blade attachment apparatus which is economical to manufacture, simple and rugged in construction, and extremely effective in use.

DESCRIPTION OF THE DRAWINGS

In the drawings, as hereinbelow described, a preferred embodiment of the invention is depicted, however various modifications and alternate constructions can be made thereto without departing from the true spirit and scope of the invention as defined in the appended claims.

FIG. 1 is a perspective view of the apparatus of this invention mounted on a tractor of which only a partial view is shown in broken outline;

FIG. 2 is a side elevational view thereof;

FIG. 3 is an end view of the apparatus; and

FIG. 4 is a fragmentary front view of the apparatus with the blade removed.

DESCRIPTION OF THE PREFERRED EMBODIMENT

Referring now to the drawings, the preferred embodiment of the apparatus, indicated generally at 10 in FIG. 1, is depicted as being detachably mounted on a conventional tractor 11. The tractor has a conventional running gear, including steerable front wheels 12, rear driving wheels 12 and their associated axle 14, together with a rear axle housing and frame 16. The tractor is further provided with a conventional hydraulic control system, not shown, that is adapted to operate hydraulically operated implements and the like which are used in conjunction with the tractor.

The apparatus 10, FIG. 1, includes a frame 17 having a pair of laterally spaced, longitudinal, hollow, box beams 18 and 19 disposed in a horizontal plane. The front ends 21 and the rear ends 22 of the beams tend to converge, while the center parts thereof diverge. At the widest point between the two beams is welded a cross member 23 which is disposed behind the front wheels 12. A spacing bar 24 (FIGS. 1 and 3), threaded on each end, is secured between the rear ends 22 of the beams by bolts 26 disposed on both sides of each beam 18 and 19. The spacing bar 24 and bolts 26 are provided to draw together or spread apart the rear ends 22 of the beams for the purpose of varying the distance therebetween. Each rear end 22 has an upstanding plate 27 welded thereto, wherein the plates are disposed substantially parallel to each other and parallel to the longitudinal axis of the tractor 11. Each plate 27 has a transverse opening drilled therethrough.

Disposed between the 18 and 19, near the front ends 21 thereof, is a V-shaped element 28 (FIG. 3) having its apex in alignment with the vertical plane through the front end 21 of each beam. A forwardly projecting boss 29, only one being shown in FIG. 2, is welded to the front end 21 of each of the beams 18 and 19 and to the apex of the element 28. Each boss is provided with a hole, not shown, wherein all are in transverse alignment. A pair of spaced-apart threaded nipples 31 are mounted in the top wall of the element 29. Disposed in the beam 18 are a pair of conduits 32 and 33, of which the forward end of each is connected to one of the nipples 21, and the rear end of each projects outwardly from the rear end 22. Thus, as noted in FIG. 2, the hoses or conduits are not disposed in an open condition along the side of the tractor where they would be subject to wear and damage caused by the heat of the tractor engine, rubbing on the frame of the tractor, or engagement with or snagging by objects foreign to the tractor.

A longitudinally extending, upwardly projecting bar 34 (FIG. 2) is mounted, as by welding, near the front end 23 of each of the beams 18 and 19. Each bar 34 has a plurality of transversely aligned apertures 36 formed therein. Disposed near the apex of the element 28 and projecting upwardly therefrom is a bracket 37 (FIG. 3). Depending from the front end 21 of each beam and adjustably mounted thereon is an adjustable skid 38, the purpose of which will be disclosed hereinafter.

Mounted by bolts on the front end of the tractor frame is a mounting plate 39 (FIG. 2) having a pair of spaced knobs 41 projecting forwardly therefrom. Pivotally secured between the knobs 41 and the bracket 37 is a hydraulic mechanism 42 for raising and lowering the front end of the frame 17.

The hydraulic mechanism 42 (FIG. 2) includes a bifurcated lower arm 43 pivotally secured on one end by a pin 44 to the bracket 37, and having a free end extending toward the rear end of the frame 17. Pivotally mounted between the knobs 41 by a pin 46 is one end of a forwardly extending upper arm 47. Mounted on the free end of the lower arm 43 is an upstanding post 48, the free end of which is pivotally mounted to the upper arm 47 between the ends thereof. The free end of a piston rod 49 of a hydraulic cylinder 51 is pivotally connected by a pin 52 to the other end of the upper arm 47. The base of the hydraulic cylinder 51 is pivotally mounted on the pin 44.

Fluidly connected to the ends of the cylinder 51 are a pair of hoses 53 which in turn are fluidly connected on the other ends thereof to the nipples 31.

A conventional blade 54 (FIG. 2), having an angle 56 and a pair of spaced holding units 57 welded to the back thereof, is secured by pins 58, only one being shown in FIG. 2, to the bosses 29. Adjusting members 59 are interconnected between the units 57 and the bars 33 at the apertures 36 by bolts 60. Thus by moving the lower end of the adjusting members 59 from one set of apertures 36 to another, the pitch of the blade 54 can be changed.

The conventional two or three point hitch assembly of a tractor includes either a pair of U-shaped apertured elements 61 (FIG. 2) mounted on the rear lower portion of the tractor frame 16 or a place for mounting same. Each plate 27 is removably mounted by bolts 62 to one of the U-shaped elements 61. As the distance between the elements 61 varies for the tractors 11 of various manufacturers, the bolts 26 on the spacing bar 24 can be adjusted to vary the space between the rear ends 22 of the beams 18 and 19. The conduits 32 and 33 are detachably connected to a pair of fluid lines 63 which are connected to the hydraulic control system of the tractor.

To mount the apparatus 10 on the tractor 11 (FIG. 1) the tractor is positioned with the front wheels disposed in the opening provided between the beams 18 and 19, the V-shaped element 28 and the cross member 23; and with the rear wheels straddling the rear end of the frame 17. The one end of the upper arm 47 is pinned or bolted to the mounting plate 39, the plates 27 are bolted to the U-shaped elements 61 and hoses 63 are connected to the conduits 32 and 33. To raise the blade 54, the hydraulic control mechanism is activated and fluid under pressure is transmitted through one of the hoses and corresponding conduit to the cylinder 51, thus causing the piston rod 49 to move upwardly, thereby causing the upper arm 47 to pivot about the pin 46. When the blade 54 is fully raised, the upper arm will be disposed in vertical plane as viewed in FIG. 2. Pressurizing the opposite hose and conduit will cause the rod 49 to retract into the cylinder 51 and the blade will lower. In the transport position (FIG. 2), the weight of the blade will be substantially carried by the post 48 and not by the cylinder 51 and rod 49.

When the blade 54 is working, the cylinder is depressured, thus preventing undue stresses on the hydraulic mechanism 42. The adjustable skids 38 are provided to position the blade at any height above the ground as required by the job being performed by the blade for the purpose of removing the weight from the front wheels during operation. Thus it will be noted that no stresses are placed on the front sections of the tractor during the operation of the blade 54. It also should be noted that the skids can be adjusted wherein the bottom of the blade will depend below the skids.

The construction of the frame 17 with the V-shaped element 28 effectively transmits all stresses to the hitch assembly and the rear end of the tractor frame. In the event a corner of the blade strikes an object, the three point mounting on the front of the frame 17 at the bosses 29 transfers the forces to both of the beams 18 and 19, thus relieving any undue stress on a single beam.

To disconnect the apparatus 10 from the tractor the bolts 62 on the U-shaped elements 61, the bolts 60 on the bars 34, and the pin 46 in the knobs 41 are removed; and the lines 63 are disconnected from the conduits 32 and 33.

Although a preferred embodiment of the invention is described hereinabove, it is to be remembered that various other modifications and alternate constructions can be made thereto without departing from the true scope and spirit of the invention as defined in the appended claims.

We claim:

1. A blade attachment apparatus for mounting on a conventional farm tractor having a conventional hitch assembly disposed on the rear frame thereof and a hydraulic control system operable to control hydraulically operated implements which are used in conjunction with the tractor, the apparatus comprising:

a pair of laterally spaced hollow beams having forward ends adapted to project forwardly of the tractor and having rear ends detachably and pivotally connected to the tractor hitch assembly;

a cross beam interconnected between said beams intermediate the ends thereof;

a V-shaped element interconnected between said beams substantially at said forward ends thereof, the apex of said element disposed in a vertical plane through said forward ends;

blade means pivotally attached to said forward ends of said element apex;

hydraulic means pivotally interconnected between the front end of the tractor frame and said element, wherein said hydraulic means includes an upper arm pivotally connected on one end to the front end of the tractor and having the free end thereof projecting forwardly therefrom, a lower arm pivotally connected on one end to said apex and having the free end thereof projecting rearwardly therefrom, a post secured on one end thereof to said lower arm free end and pivotally connected on the other end thereof to said upper arm between said one end and said free end thereof, and hydraulic cylinder means connected on one end to said lower arm and pivotally connected on the other end to said upper arm free end;

hydraulic lines fluidly interconnecting said hydraulic cylinder to the tractor hydraulic control system; and said hydraulic means operable in response to the operation of the hydraulic control system to raise and lower said blade.

2. A blade attachment apparatus as defined in claim 1 wherein upon fully raising said blade said upper arm is vertically disposed.

3. A blade attachment apparatus as defined in claim 2 wherein said upper arm, and said hydraulic lines are detachably connected to the tractor.

4. A blade attachment apparatus as defined in claim 3 and including spacer bar means interconnected between said beams near said rear ends for positioning said beams laterally relative to each other.

5. A blade attachment apparatus as defined in claim 4 and including adjustable skid means disposed on said forward ends for positioning said blade relative to the ground.

6. A blade attachment apparatus as defined in claim 5 and including adjusting members interconnected between said beams and the upper portion of said blade for adjusting the pitch of said blade.